(12) United States Patent
Bunn et al.

(10) Patent No.: US 7,999,857 B2
(45) Date of Patent: Aug. 16, 2011

(54) VOICE, LIP-READING, FACE AND EMOTION STRESS ANALYSIS, FUZZY LOGIC INTELLIGENT CAMERA SYSTEM

(75) Inventors: Frank E. Bunn, Thornhill (CA);
Richard D. Adair, Waterloo (CA);
Robert N. Peterson, Scarborough (CA);
David D. Adair, Wheatfield, NY (US)

(73) Assignee: Stresscam Operations and Systems Ltd., Toronto, Ontario (CA)

( * ) Notice: Subject to any disclaimer, the term of this patent is extended or adjusted under 35 U.S.C. 154(b) by 1956 days.

(21) Appl. No.: 10/626,888

(22) Filed: Jul. 25, 2003

(65) Prior Publication Data
US 2006/0028556 A1 Feb. 9, 2006

(51) Int. Cl.
*H04N 5/232* (2006.01)
*H04N 7/18* (2006.01)

(52) U.S. Cl. ............... 348/211.1; 348/143; 348/211.5; 348/211.6

(58) Field of Classification Search ............ 348/143
See application file for complete search history.

(56) References Cited

U.S. PATENT DOCUMENTS

| | | | | |
|---|---|---|---|---|
| 1,655,002 A * | 1/1928 | Winning et al. | ............ | 70/303 A |
| 1,736,183 A * | 11/1929 | Winning et al. | ............ | 70/25 |
| 2,181,265 A * | 11/1939 | Dudley | ............ | 704/205 |
| 3,195,533 A * | 7/1965 | Fischer | ............ | 600/508 |
| 3,971,034 A * | 7/1976 | Bell et al. | ............ | 346/33 R |
| 4,630,110 A * | 12/1986 | Cotton et al. | ............ | 348/153 |
| 4,857,912 A * | 8/1989 | Everett et al. | ............ | 340/508 |
| 4,868,750 A * | 9/1989 | Kucera et al. | ............ | 704/8 |
| 5,067,012 A * | 11/1991 | Lemelson | ............ | 348/161 |
| 5,539,454 A * | 7/1996 | Williams | ............ | 348/169 |
| 5,689,241 A * | 11/1997 | Clarke et al. | ............ | 340/575 |
| 6,006,188 A * | 12/1999 | Bogdashevsky et al. | ............ | 704/270 |
| 6,031,573 A * | 2/2000 | MacCormack et al. | ............ | 375/240.16 |
| 6,055,501 A * | 4/2000 | MacCaughelty | ............ | 704/272 |
| 6,240,365 B1 * | 5/2001 | Bunn | ............ | 701/213 |
| 6,363,346 B1 * | 3/2002 | Walters | ............ | 704/231 |
| 6,400,264 B1 * | 6/2002 | Hsieh | ............ | 340/506 |
| 6,523,008 B1 * | 2/2003 | Avrunin et al. | ............ | 704/273 |
| 6,608,559 B1 * | 8/2003 | Lemelson et al. | ............ | 340/539.13 |
| 7,027,621 B1 * | 4/2006 | Prokoski | ............ | 382/118 |
| 7,696,869 B2 * | 4/2010 | Brown | ............ | 340/539.22 |
| 2006/0109341 A1 * | 5/2006 | Evans | ............ | 348/14.08 |

* cited by examiner

*Primary Examiner* — Ngoc-Yen T Vu (57) ABSTRACT

Revealed is an intelligent camera security monitoring, fuzzy logic analyses and information reporting system that includes video/audio camera, integrated local controller, interfaced plurality of sensors, and input/output means, that collects and analyses data and information observations from a viewed scene and communicates these to a central controller. The central controller with fuzzy logic processor receives, stores these observations, conducts a plurality of computer analyses techniques and technologies including face, voice, lip reading, emotion, movement, pattern recognition and stress analysis to determine responses and potential threat of/by a person, crowd, animal, action, activity or thing. This invention recognizes possible terrorists, criminals, enraged or dangerous persons and also can identify a person's level of intoxication or impairment by alcohol or drugs via a new "Visual Response Measure". The invention provides an intelligent tool to assist security systems and personnel, improving capability to record, display and share information and maintain security.

20 Claims, 8 Drawing Sheets

VOICE, LIP-READING, FACE AND EMOTION STRESS ANALYSIS, FUZZY LOGIC INTELLIGENT CAMERA SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENTIAL LISTING, A TABLE, OR A COMPUTER PROGRAM LISTING COMPACT DISK APPENDIX

Not Applicable

BACKGROUND OF INVENTION

Security of things, places, and people has long been a major area of patenting of methods, systems, techniques, and technology. The first mechanical locks for security of things were made of wood, and records show them in use some 4,000 years ago in Egypt; the first all-metal locks appeared about the year 890 in England. In the 18$^{th}$ century, the idea of a key-operated lock using circular patterned sliders was invented by the oldest lock company in the world, Bramah Security Equipment, which still makes these locks today. This idea developed to a circular disk type of padlock patented by R. K. Winning, in a U.S. Pat. No. 1,655,002, dated Jan. 3, 1928, which he followed with U.S. Pat. No. 1,736,183, dated Nov. 19, 1929, that was assigned to the Dudley Lock Corporation. This is the typical "high school locker, lock" used to this day by most school age children. Bunn, in 2001 U.S. Pat. No. 6,240,365 advances the security of things and people to drivers and their automobiles incorporating a plurality of sensors and devices including wireless communications, GPS location, and driver access key pad and credit card/smart card technologies.

The origin of securing things, places and people by people analyzing specific relevant information seems to have begun in Madrid, Spain, several centuries ago in which time the Spanish people did not trust mechanical locks. There, neighborhoods were guarded by patrolling watchmen carrying the keys to the buildings being patrolled. When anyone wished to enter a locked building, they had to loudly and noisily attract the attention of the watchman. The watchman would assess whoever was requesting entrance and, if approved, would permit access, relocking the building behind them. The assessment done by the watchman would likely include looking at the faces of the entrants to recognize them, listening to the reason for entrance and assessing the truth of the same, observing the nervousness of the entrants to detect deceit or lying, and likely viewing the surroundings for evidence of possible accomplices or potential threat.

Replacing patrolling watchman with security video cameras is well known. Lemelson, in 1991 U.S. Pat. No. 5,067,012, reveals a method and system for scanning and inspecting video camera images for automated recognition of objects and MacCormack, et al. in 2002 U.S. Pat. No. 6,031,573 reveal an intelligent video security camera management system for performing multiple comparative functions in parallel in order to reduce the volume of video tape recordings and reduce the time to retrieve information from those tapes.

Hsieh, in 2002 U.S. Pat. No. 6,400,264, expands on the security camera applications by teaching an indoors surveillance camera in a building or the like in which intruders have entered and a "far end" remote, fixed or mobile, monitor that allows security personnel patrolling the neighborhood of the building, to observe conditions at the location of the camera from a safe location removed from the camera location. Hsieh teaches an intelligent camera that transmits its images to a "patrol box" which includes coded access for security personnel only so they can view the camera images stored at the patrol box and/or for them to control the camera.

Cotton, et al. in 1986 U.S. Pat. No. 4,630,110, teach a system and methods using a plurality of video surveillance cameras to monitor cash registers and cashiers for potential theft or coercive actions to fraudulently misrepresent billing for items being sold. This system uses intelligent controllers for displaying selected camera images either live or in playback of recorded images for viewing by security personnel. Everett, Jr., et al., in 1989 U.S. Pat. No. 4,857,912, teach an intelligent security assessment system which robotically patrols for fire, smoke, flooding and intrusion in a given area much like the Spanish watchman patrolling the neighborhood described earlier. This patrolling robot carries a multiplicity of intrusion sensors and integrating the input information from the sensors and weighing their sums relative to a reference level the system eliminates false detections; for a valid detection, it then automatically activates a security video camera on the robot and a monitor display remotely for security personnel observation. Chim, in 2001 U.S. Pat. No. 6,275,258, teaches a video camera which follows or "tracks" a speaking person as they move about, by pointing the camera in the direction of sound of the speech, in order to provide a means of keeping the image of a teleconferencing speaker in the visual center of the image being observed by a video camera.

The problem with all of these existing technologies is that they rely on detecting the physical presence of material conditions considered out of the ordinary, such as presence of smoke and heat indicating fire, or presence of people to indicate intrusion, and they usually rely on security personnel verification by viewing video camera data either live or in replay. This can be time consuming, and where automated continuous video display is used these technologies can lead to security personnel boredom resulting in overlooked or neglected observations and ineffective security.

Replacing the patrolling watchman, who listens to what a subject says in order to determine his intent or truthfulness, with automated voice stress analysis is also well known. Dudley, in his 1939 U.S. Pat. No. 2,181,265, described methods and apparatus for measuring and recording the voice of human subjects by microphone and amplifiers that were wired through a multiplicity of frequency channels to a multi-pen chart recording system for later observation by skilled interpreters. Dudley recognized that text of written or spoken words omit all those things that enter into the voice, such as stress, intonation, duration, brogues and accents, slurring and weakening of sounds and the various other characteristics which go to make up speech which he teaches can be interpreted from visual analysis of these frequency channel recordings. Fischer, in his 1965 U.S. Pat. No. 3,195,533, expanded upon the ideas of measuring the physiological and emotional nervous system stress and reaction of subjects by placing a plurality of bioelectric sensors on various locations on the skin of subjects and wiring these from the subjects to a chart recording system for later observation by skilled analysts.

Bell, Jr., et al., in 1976 U.S. Pat. No. 3,971,034, carry further the voice analysis for detecting psychological stress by displaying on chart recorders infrasonic voice modulations related to psycho-physiological state changes in subjects relating specifically to lie detection methods. Bogdashevsky, et al., in 1999 U.S. Pat. No. 6,006,188, advance the analysis function of voice stress analysis from the more manual chart reading analysis methods to a hardware, software and/or firmware system including a stored knowledge database of one or more speech models corresponding to a characteristic group of reference subjects to which the recording of a subject's speech can undergo comparative analysis for determining psychological or physiological stress characteristics. MacCaughelty, in 2000 U.S. Pat. No. 6,055,501, advances this voice stress analysis further to detect counter homeostasis oscillation perturbation signals within the wave form of human subjects that are said to reflect arousal or other biological processes in the autonomic nervous system.

The addition of textual information to that of voice stress to improve the detection of a potential security threat is also well known. Kucera, et al., in 1989 U.S. Pat. No. 4,868,750, teach a system in which a voice/text translator facility converts a subject's speech into text and then teaches a system of grammatical annotation of natural language with which each word of the subject's text is compared for analyses to constructed intelligent words and phrases to establish the meaning and intent of the subject's speech.

Walters, in 2002 U.S. Pat. No. 6,363,346, teaches combining the methods of text extraction from automated speech recognition analysis of a telephone calling subject's speech and the automated analysis of electronic voice signals of the subject's speech for voice stress analysis to predict the physiological state of the calling subject. Avrunin, et al., in 2002 U.S. Pat. No. 6,523,008, further advance these techniques to the application for truth-enabling internet communications of computer automated analyses again combining text extraction and voice stress analysis of the speech and text of internet subjects.

The above clearly indicates it is well documented and understood that measuring of physiological stress of people can permit the understanding of not only what a person (or persons) is saying but whether that person(s) is under stress when saying it, and that this can be related to the truthfulness of what is being said as well as related to the presence of a threat or a threatening intention from that person or persons.

The use of security surveillance video cameras to provide visual images to security personnel for monitoring people places and things is well known, as are the problems of boredom and neglect they cause the security personnel viewing the monitors displaying the views of such cameras. Automating the recognition of objects monitored by such video cameras is one step towards providing the security personnel with more intelligent information than just a repetitive, boring, mind numbing and mostly unchanging visual scene.

BRIEF SUMMARY OF THE INVENTION

The invention herein described provides a computerized security and surveillance intelligent camera system as a tool to improve the capability of a watchman, security guard, security system or in the broader sense anyone or any system, to detect security problems and hostile terrorist threats or actions before and during their occurrence, and to notify the appropriate authorities of such actions and occurrences. In a preferred embodiment of the invention, the security problem is a person or persons who may be, or cause a security threat. Included is an intelligent camera system and sensors that detects, stores and analyzes visual and acoustic signals comprising observations of persons, their surroundings and their actions, and using fuzzy logic determines if a security threat is present or potentially present, and if so present informs the appropriate authorities.

Security personnel today often suffer from boredom and distraction leading to their neglecting of potential security problems. This often is due to repeated false or null indications constantly being presented to them by the many electronic and automated video, audio, and proximity surveillance systems in use today. However, like the Spanish watchman of centuries ago doing his rounds, the means revealed in this invention automatically receives information input data from a multiplicity of sensors, conducts detection analyses, information extraction analyses, and assesses the likelihood of the existence of a security problem. This is accomplished by using fuzzy logic analyses of all information input to the system and from related databases to make the decision as to whether a security problem exists, and if it does, whether it requires the attention of security personnel, and if so required, it informs the appropriate personnel or systems.

This invention teaches an intelligent security camera system which combines many of the above mentioned acoustical and video sensors and systems, to record, process and analyzes some of but not limited to: Sound; Voice; Face; Cultural appearance; Facial Coloring; Text deep extraction; Lip-reading; Facial and Emotional action; and to implement stress analysis methods and processes for detecting physical presence of material conditions in addition to detecting emotional conditions of the subjects being observed through analyzing the data from such sensors and systems and using fuzzy logic, and to conduct analyses to determine the potential presence of a security breach or terrorist threat. The Spanish watchman described earlier used human intuition and understanding to interpret the validity of the intention or threat of people by observing and possibly recognizing their appearance, speech, actions and environment surrounding them. We disclose herein an intelligent security camera system that using fuzzy logic, integrated computer circuitry, and multiplicity of sensor systems can implement many of the above techniques, methods and analyses to automatically interpret the stress: in the speech; in the voice; in the facial and body movements; in the emotions; as well as stress, tension and meaning of textual content from deep extraction of key words or phrases from the speech, of a person or persons under surveillance in an observed environment.

In a preferred embodiment, this invention, using wired or wireless communications in short bursts or constant contact with security systems or personnel, can alert them to potential threat including but not limited to passing on analyses results, video images and alerts to stationary or mobile systems such as but not limited to security facilities and systems, portable computers, as well as hand held personal data assistants (Palm or Blueberry for example) and/or RF radios and cellular telephones and the like. As a tool, this invention can improve capability of security personnel or systems to detect and understand potential security threats and therefore allow them to take the appropriate responses and actions to maintain the integrity and safety of people, animals, places and things.

In a unique and preferred embodiment of this invention, we incorporate the use of automated lip reading as yet another sensing means capability of obtaining the speech of a subject where voice acoustics are of poor quality or possibly not available but visual and/or video surveillance are available. Lip reading is, in this way, an alternative to observing speech at a distance for the purpose of analyzing and interpreting the potential of a criminal, illegal, or threatening intention of a person or persons. Alexander Graham Bell, the Scotsman who emigrated to Canada in 1870 and later to the USA, was taught by his deaf mother the standard "finger alphabet", and by his elocution teaching father the "visible speech" methods of communications with the deaf. Bell is considered by many to be the North American "father" and promoter of lip reading and his pioneering work has lead to the universal acceptance of this method of human communications. A great many patents have been issued for technology, apparatus and methods for the purpose of teaching the deaf and others to lip read including the modern day video techniques cited in U.S. Pat. Nos. 4,546,383; 5,313,522; 5,586,171; 5,689,575; 5,734,794; 5,982,853; and 6,332,123. Computerized audio and visual teaching aids also have been created such as audio tape recordings of aids and techniques to illustrate audio sounds associated with phonetic symbols, and such as random accessible computer CDs of consonants, vowels and various prosodic phenomena.

All of the above noted "Lip Reading" work is directed mainly at the instruction of the deaf and others to teach them to read lips and in many cases learn to speak. This invention reveals the methods and means to automatically observe and read lips and turn what is observed into text information for anyone to read, hear, or electronically, understand and process. These methods and means can function in any language including but not limited to English. We reveal here a hardware, software and/or firmware system means to observe and to convert what is visually observed as speech whether human, non-human or animated, into human and/or machine understandable textual, visual or spoken, speech or information.

DETAILED DESCRIPTION OF THE INVENTION

The descriptions that follow are provided so as to enable any person skilled in the art to make and use the invention, and sets forth some modes presently contemplated by the inventors of carrying out their invention. Various modifications, however, will remain readily apparent to those skilled in the art, since the generic principles of the present invention have been defined herein.

Figure 1:
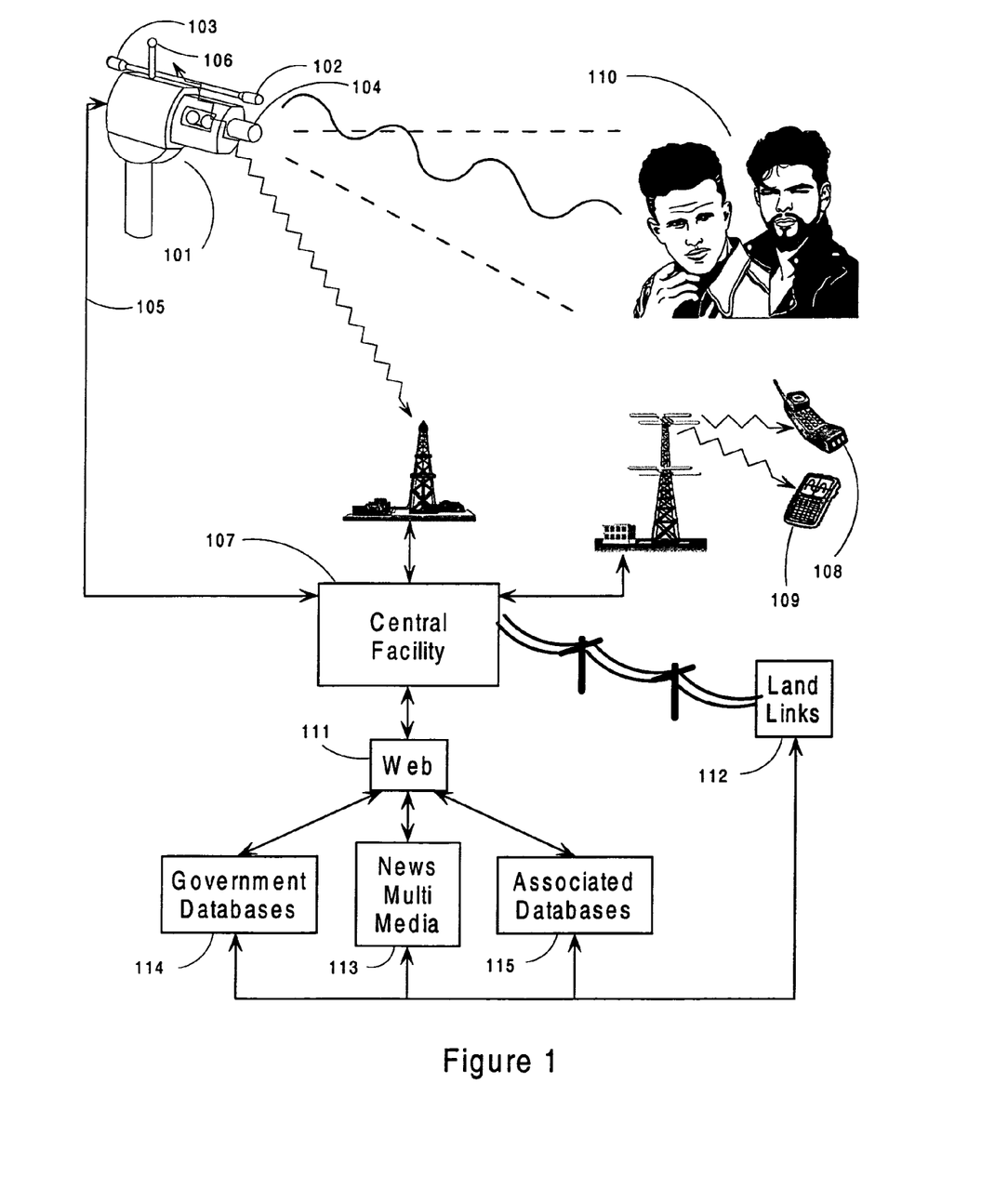
FIG. 1 is a schematic diagram of a Camera System means according to an embodiment of the present invention including a camera means with its incorporated local controller, the central facility with incorporated central controller and related databases, and wireless and land line linkages.

The Camera System means, illustrated in FIG. 1., of this invention incorporates the use of, but not limited to, sensors such as a surveillance video camera means with incorporated local controller, 101, with forward, 102, and backward listening audio detection capability, 103, and video detection viewing capability, 104, functions and the camera system could but not necessarily have, full pan, tilt and zoom computer controlled motion for monitoring of a given scene, situation, place, thing, persons or environment. The Camera System means can provide the camera means, 101, with communications means for communications means of hardwired, 105, or wirelessly connected, 106, to a central processing and security systems/facility, which may be located at the facility where the surveillance is occurring or at a remote location, either of which, with incorporated central controller, 107, to storage systems, connecting to databases, connecting to fuzzy logic processors, and/or connecting to mobile portable cellular or FM radio phones, 108, or connecting to PC facilities and connecting to personal data assistants (PDA's such as "Palm" or "Pocket PC" and the like), 109. Intelligent analysis and fuzzy logic functions means may be integrated into the camera means or any of the so connected or connectable facilities forming the complete Camera System means of FIG. 5.

In a preferred embodiment, camera system means illustrated in FIG. 1., of this invention could be observing a person or persons and their activity, 110, with a plurality of sensors such as but not limited to audio and video so that the intelligent analysis means can interpret those person, persons and/or activities for potential threat and can record the speech and facial observations for identification using but not limited to comparisons to databases of audio, visual and speech and text information to which the facilities are connected via the Internet WEB, 111, or by hardwired land, 112, or telephonic or wireless links, 108 and 109.

A unique aspect of the Camera System means of this invention illustrated in FIG. 1., is its ability to learn from the data collected from these observations and from data in and collected for the comparison databases means. These database means and facilities, whether incorporated into the camera means or located elsewhere, can include local and remote databases including but not limited to: the Multi-Media, 113, such as print including news papers, radio and TV; the Government, 114, such as criminal activity/conviction or drivers license identification or terrorist activity; and the Associated data systems, 115, such as medical/mental health, or incarceration, or education, and the like. Health information, accessed by the Camera System means, in particular could be critical in understanding the actions of persons to recognize the differences between drunkenness, heart attack, diabetic coma, epileptic seizure and the like. These databases and their information as accessed by the Camera System means can become as part of the Camera System means and can be linked via the WEB, hardwired, telephony or wireless means. Learning by the Camera System means by comparison of the observations it makes with video and audio detection to the information available in these databases, can result from the Camera System means making a plurality of analyses, conducted by the Intelligent Camera System means in FIG. 5., 503, such as but not limited to the Intelligent Camera System use of fuzzy logic processor, 501, and resulting comparisons with information stored in the general facility databases, 502, including but not limited to previous visual data such as faces of persons, and/or audio data such as speech, and/or text data such as key words or phrases. Such comparisons from which the system using fuzzy logic matches those aspects of the current observations, the system can proceed to learn that the person being observed has, for example, used the word "Bomb" but because, for example, the person's actions in reference to a database of actions can not be considered a threat and, for example, the person's face can not be recognized in reference to a database of faces, hence the fuzzy logic processor, 501, of the Camera System means in this example, from such learning, decides to save the new face and speech and key word "bomb" for future comparison. The Camera System means so learns that this person currently under surveillance observation is a person for the Camera System means to "watch out for" in the future and at the same time it decides to continue current observations of this person, in case further data matching to the databases indicates a true or potential threat exists or could occur.

A plurality of threats or threatening conditions can be detected and responded to by this Camera System means including but not limited to terrorist threats, personal threats physical or otherwise, telephony harassment, unauthorized entry or exit, dishonesty and fraudulence such as misuse of credit cards or smart cards or proximity identification systems and the like threats. To all of these potential conditions, actions or people, it is the observation, the data collection, the database structures and storing of information for comparisons and the fuzzy logic analyses and interpretation from any, some, or all data from the databases or from observations of persons, places and things and the resulting recognition of their meaning and possibility of threat that this invention reveals.

Figure 5:
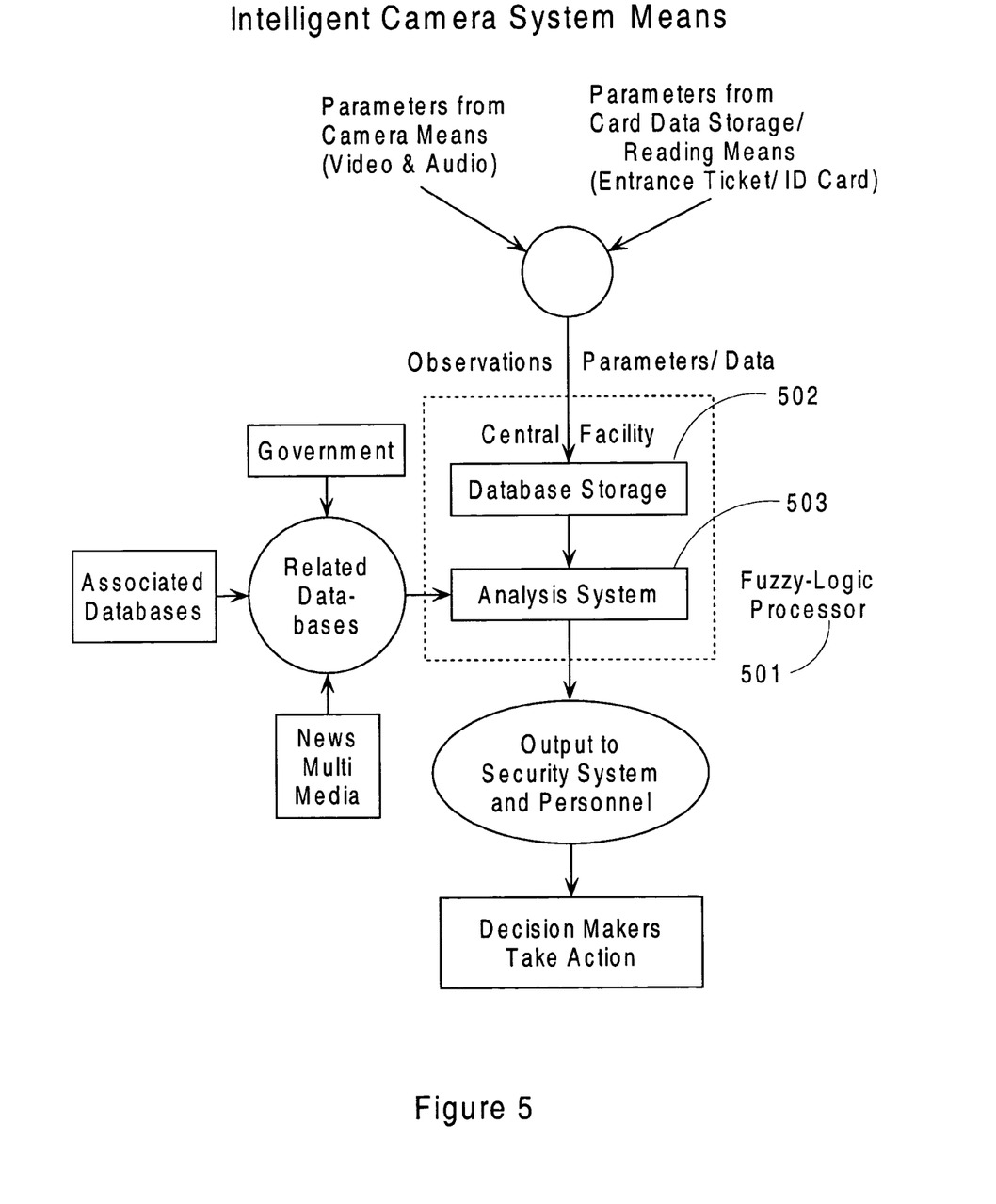
FIG. 5 is a block diagram focusing on the fuzzy logic processor of the Intelligent Camera Means system of this invention with the observation sensors, camera means with integrated local controller and card reading and display I/O systems linked to the central facility with integrated central controller, database storage, centering on analyses with fuzzy logic processor and its linkages to related databases and to security reporting.

The Intelligent Camera system Means of FIG. 5., that incorporates a fuzzy logic processor, 501, means of this Camera System means will include a plurality of computer analyses techniques and technologies, software, firmware and hardware methods and designs including but not limited to recording and storage and retrieval of data, video pattern recognition, facial recognition, body action recognition, stress analysis of facial appearance and movement, stress analysis of body appearance and movement, emotional condition stress analysis from facial and/or speech and/or body action, surrounding environment condition assessment, voice stress analysis, voice recognition, voice speech recognition to text, lip reading recognition of speech and conversion to text, deep extraction of information and meaning from text or multi-media information, and the like.

Many of these techniques and technologies have been noted in the background to this invention, but what is unique in this invention is that we reveal a Camera System means for the combination of these into one integrated system: a "Voice, Lip-reading, Face and Emotion Stress Analysis, Fuzzy Logic Intelligent Camera System" for intelligent analysis and automated learning and decision analysis for the detection and understanding of a threat or potential threat by a person or persons or animals or objects, or by their actions, or by their appearance or by their speech or any combination of these.

Figure 2:
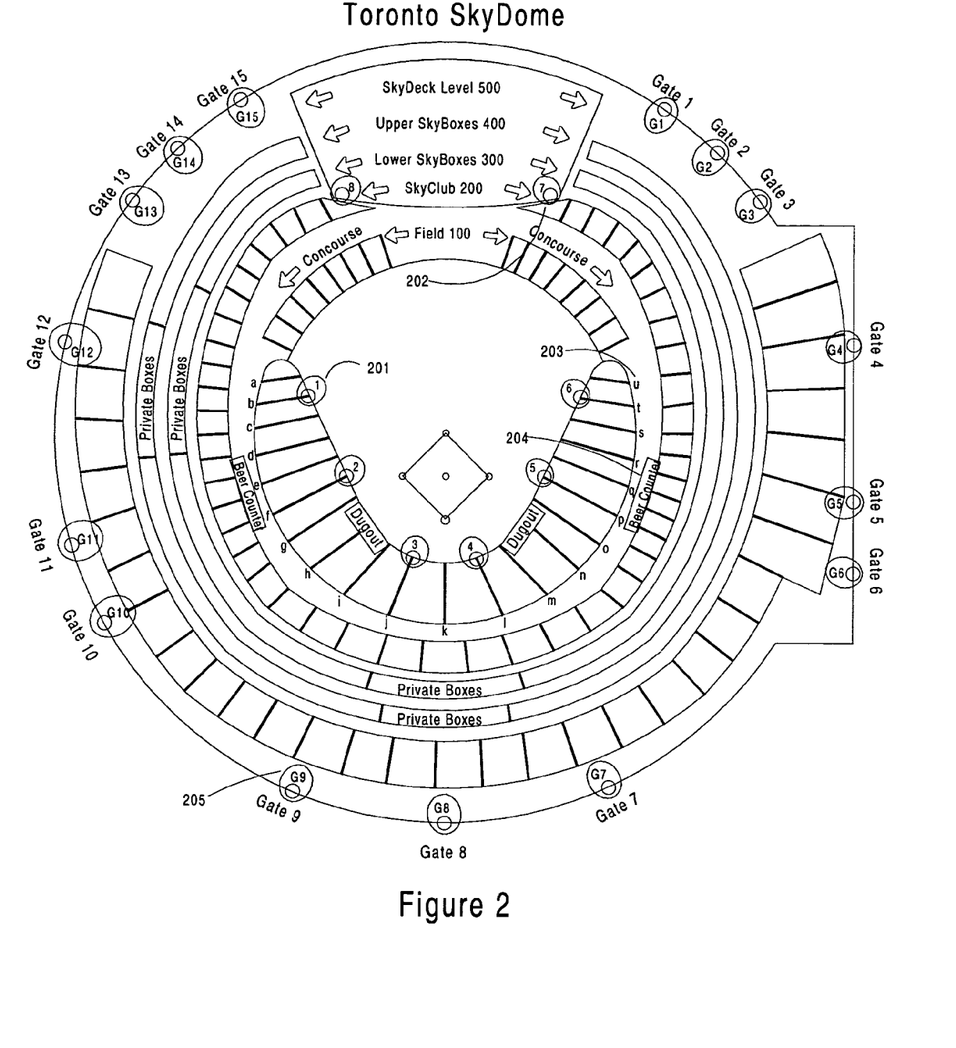
FIG. 2 is a schematic diagram of an athletic arena, and in particular a representation of the Toronto SkyDome, illustrating relative locations of the camera means according to an embodiment of the present invention.

An illustrated example could be a threat to people and/or property. Referring to FIG. 2, we use the application of this invention to the sports arena environment and more specifically addressing the security problem of sports fans posing a potential threat to the sports athletes, other fans and persons at the arena or the arena itself, which application of our invention we refer to as a process of scanning the sports fans. This could include but not limited to throwing objects at athletes or fans or others at the arena; fans going onto the athletic field and interfering with the athletes or activities on the field; fans or persons being loud and/or abusive; fans or persons being intoxicated; fans or persons being a threat to their own well-being and the like. FIG. 2, shows the Toronto, Ontario, "SkyDome" as the example arena in which we have indicated six surveillance audio-video camera means, 201, (1 to 6) located at field level and two more, 202, (7 & 8) at the 200 level. Also indicated on the concourse level, 203, are 21 usher/security personnel (a) through (u), located near the entrance to each aisle of the field level seats as well as locations, 204, of 2 beer purchasing counters. An optional additional 15 cameras, 205, G-1 through G15 could be positioned at each of the entrance gates to the arena.

In this example of a preferred embodiment of the Camera System means, illustrated in FIG. 2., the six camera means, 201, with full pan, tilt and zoom functions have the software and hardware means to continuously scan the fans in the stands and the system has the analysis and database comparison information means in order to recognize and detect sounds, speech, actions or activities of the fans that may indicate a threat or threats such as noted. The camera means having forward listening and backward listening microphone means, 102 and 103, and through the Intelligent Camera System means fuzzy logic capability illustrated in FIG. 5., 501, can access and utilize the Camera Means Information logic indicated in FIG. 6, for camera control means, 607, with analyses to effect the camera means to point in the direction from which the microphones detected sound that the fuzzy logic decided requires video surveillance, can be so pointed by the Camera System means. The camera means so directed views the area from which the sound was or may still be emanating and further fuzzy logic analyzes the images and the sounds being observed and with the analysis means, compares them, through the communication linkages, illustrated in FIG. 1., 111 or 112, to information in the databases from which the camera system means fuzzy logic can analyze the observed and database accessed information and can assess possible threat.

Figure 6:
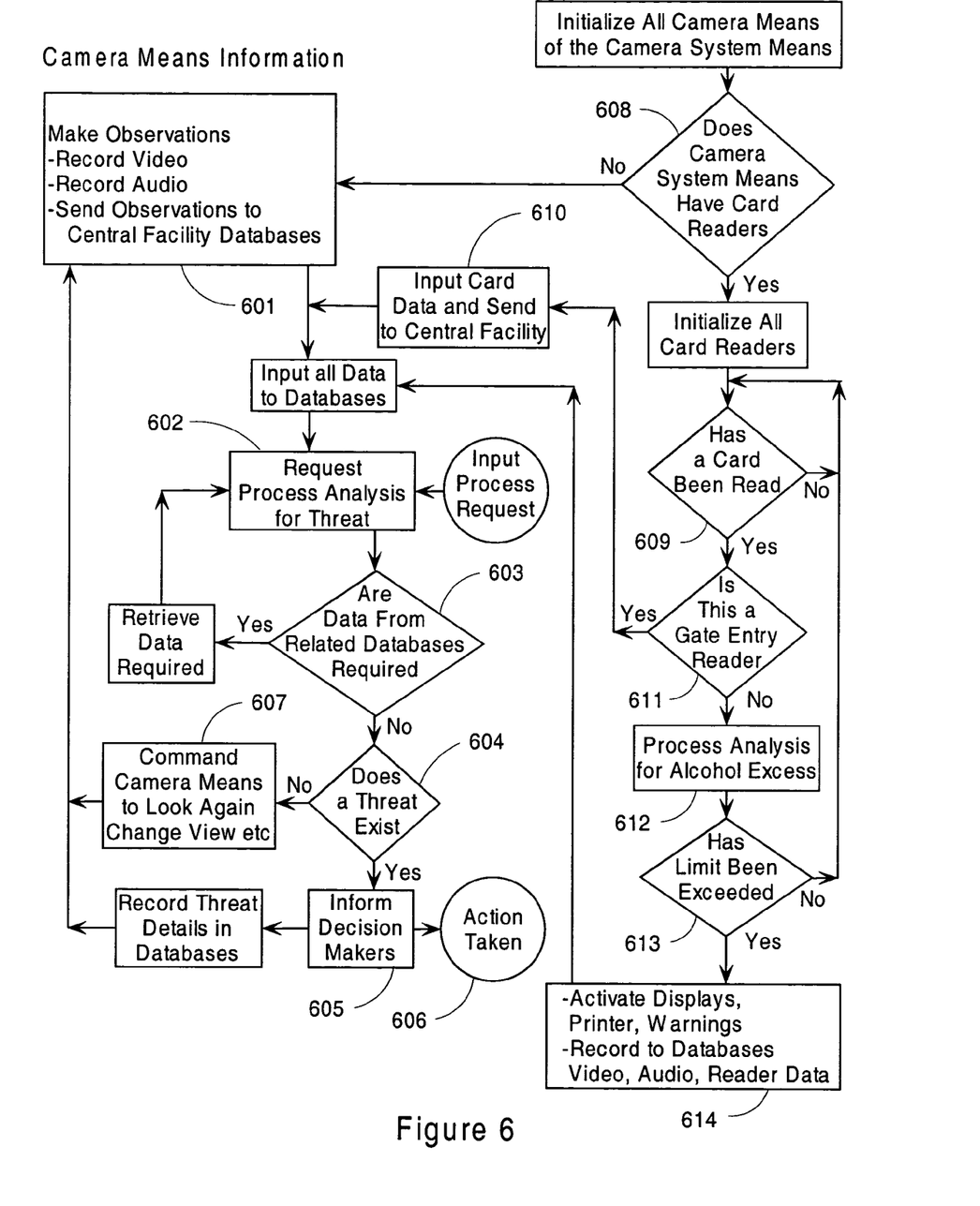
FIG. 6 is a schematic diagram of process flow incorporating the fuzzy logic processor and analyses system of FIG. 5 for the logic of detection of a threat from the camera means observations and for alcohol purchase monitoring for avoidance of alcohol excess and its potential threat contribution.

Many possible comparisons by the Camera System means fuzzy logic could occur, such as but not limited to: a person being observed, 110, by the video camera of the Camera System means of FIG. 1, and the analyses of that video data by the Intelligent Camera System means of FIG. 5. using the fuzzy logic of the Camera Means Information of FIG. 6., 601, is matched by the Camera Means Information analysis, 602, to the image of a person guilty of assault recorded in one of the databases, 603; or with similar steps of logic for the case of audio data observations of the person, the language of a person being observed is, or could be interpreted as emotionally angry or abusive or intoxicated or a combination of these; or with the video data analyses, the actions of a person being observed indicate likelihood of the person attempting to throw an object at an athlete on the athletic field; or the actions of a person being observed indicate the likelihood of the person attempting to enter the athletic field or such like. If and when Camera System means fuzzy logic incorporated in the fuzzy logic processor illustrated in FIG. 5., 501, accessing the logic of the Camera Means Information of FIG. 6., finds a match that is a threat, 604, then at any facility employing the Camera System Mean it can inform the security facility, 605, at any such facility in this example at the arena such as at the Central Facility indicated in FIG. 1., 107, or the security personnel via wireless communications, 108 or 109, for appropriate actions, that the Camera Means Information fuzzy logic indicated in FIG. 6., decides, 606, to be taken.

Alcohol abuse and intoxication are well known as a related contributing factor to fan-caused disruption and threat at athletic arenas and for such, the Camera System means can implement a unique sensor, data collection and database logging means. We reveal the new idea of tracking tickets of fans in the venue such as a sports arena and in so tracking the tickets we reveal a method for also tracking the purchase of alcohol. It is also contemplated in this invention, that a new "Visual Response Measure" can be established and used to identify the that a person is drunk, intoxicated or impaired by alcohol or drugs and that standard sets of levels of such intoxication or impairment can be identified and used to classify a person's level of intoxication or impairment.

Figure 3:
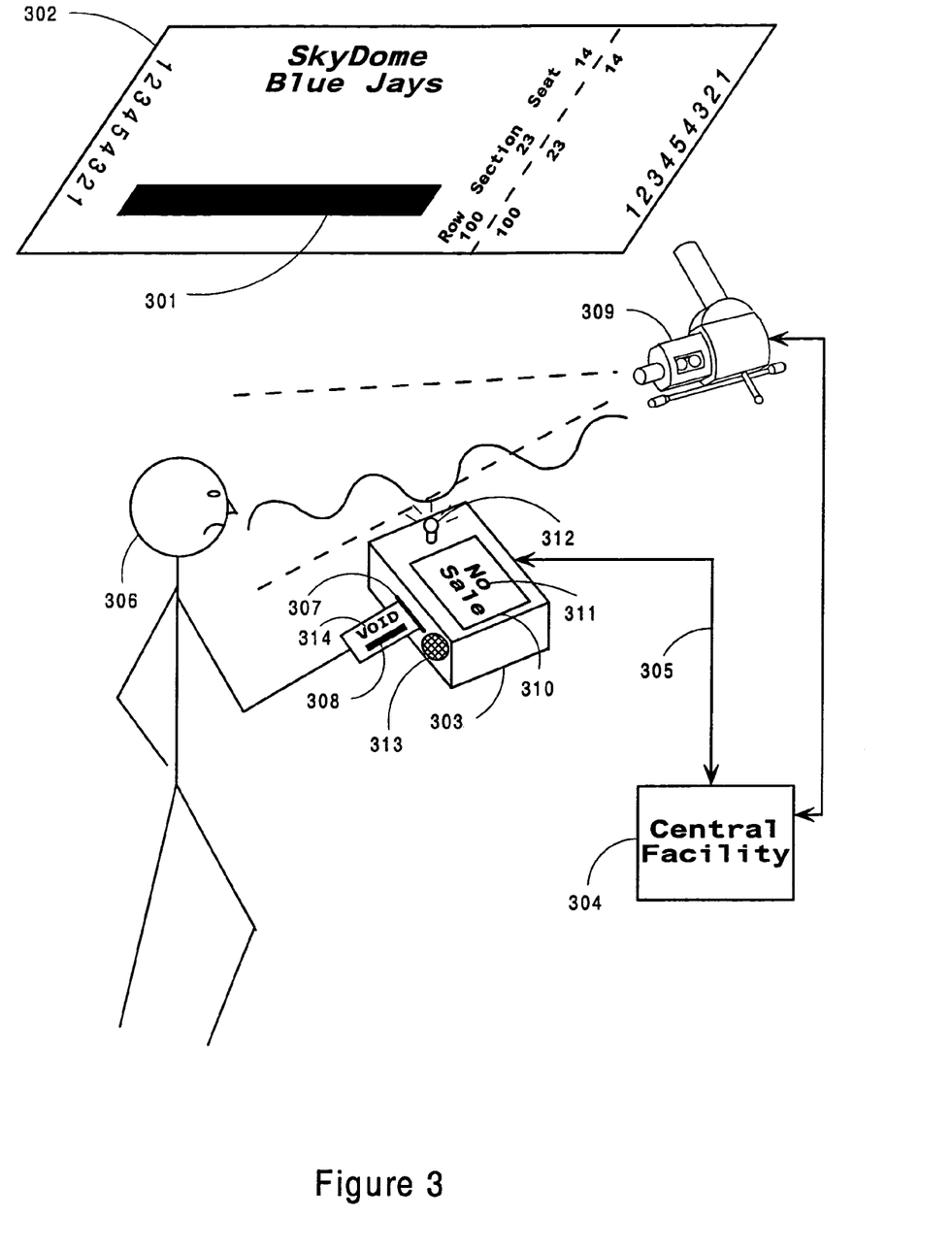
FIG. 3 is a schematic diagram of a camera means with incorporated local controller and card reading/writing means and display means for reading entrance tickets of fans for tracking of their tickets related to control of alcohol purchasing according to an embodiment of the present invention.

Tracking of tickets can be done using the well known magnetic strip recording/data storage means indicated in FIG. 3., 301, used with credit or debit cards, or parking lot entrance/exit tickets and the like, or smart cards, or proximity cards, and incorporating one or more of these technologies into the physical tickets to the arena, 302. Recorded on this recording/data storage means could be information such as but not limited to the seat or location allowed fan access, the date and performance being attended, the cost of the ticket, sales location, method of payment for the ticket and the like. In the case of seasons ticket holders, the seat location information could be preloaded into the databases of the Camera System means ahead of actual attendance at the arena; the holder's identification information could be stored for future reference by the Camera System means as well. The recording means on the ticket could also be a printed means, such as bar code or magnetic printing and the like, for which the reading/writing means would be designed and implemented also to read and write these.

Figure 8:
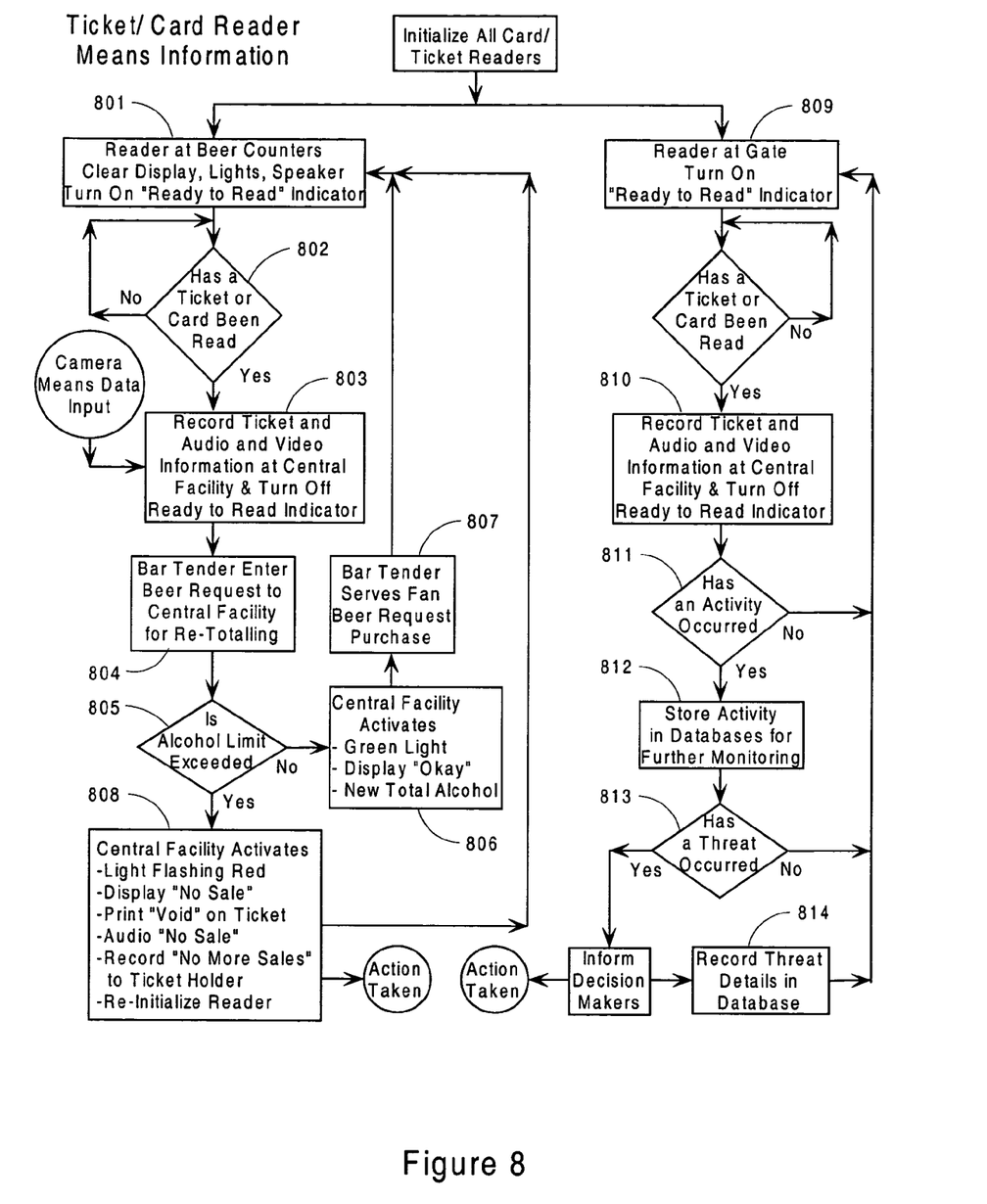
FIG. 8 is a schematic diagram of process flow incorporating the fuzzy logic processor of the Intelligent Camera Means system of FIG. 5, centering on analyses with fuzzy logic processor for detailing the logic for processing and analyzing ticket reading and writing related to alcohol monitoring and related to entrance gate monitoring and related detection of threat.

Usually the fan retains a portion of the ticket as proof of paid entry and for display to security people to access the fan's seat or location during his attendance at the arena. The ticket recording/data storage means could be located only on the ticket portion retained by the fan, 302, or could also could be located on the portion retained by the arena. At the entry gates to the arena the ticket reading logic as illustrated in FIG. 8., 809, located at said gates as illustrated in FIG. 2, 205, using the reading means illustrated in FIG. 3., 303 and fuzzy logic of the Camera Means Information accessing and analyzing said reading as illustrated in FIG. 6, 608, could be located to read, 609, and store with the central facility, 304 noted in FIG. 3. and the reader data analysis fuzzy logic interpretation of said reading, illustrated in logic of FIG. 8., 810, communicated via using wired or wireless communications, illustrated in FIG. 3., 305, the data recorded on the ticket as indication of entrance, and as communicated to the Camera Means Information system logic indicated in FIGS. 6., 608, 609,610 and 611, of a fan holding that ticket. Either the fan or security personnel, operating the reader system indicated in FIG. 3., the security personnel or the fan, 306, could place the ticket into the reading means and retrieve it following its being read and the fan could proceed to enter the arena taking his portion of the ticket with him.

If the ticket recording/data storage means is located just on the ticket portion to be retained by the fan, then this portion or the whole ticket would need to be placed in the reading means and the fan would have to wait for the reading task to be completed before entering the arena with his portion of the ticket removed from that portion retained by the arena. It is also possible that the reading means, indicated in FIG. 3., 303, could incorporate a writing means, 307, for the Camera System means to automatically write on the ticket recording/data storage means, 308, additional information such as but not limited to gate and time of entry. It would be possible also to include a numeric input key pad on the reading means, 303, to enter information, which subsequently is communicated to the Camera Means Information system of FIG. 6., 611, manually for the Camera System means to write the additional information onto the recording/data storage means.

It is not necessary for the arena to retain a ticket portion or even for the ticket to be separable into portions; however, for the following ticket tracking use in monitoring and controlling alcohol use, it is necessary that the ticket recording means at least be located on the ticket or ticket portion retained by the fan. If a separable ticket is used, the fan or the arena personnel at the entrance gate, could have the ticket information read into the reader of FIG. 3., 303, communicated to the Camera Means Information fuzzy logic system of FIG. 7., 709, could separate the ticket portions at the entrance gate and only that portion retained by the arena need be read, and communicated to the fuzzy logic system of FIG. 7., 710, thereby allowing the fan to proceed into the arena with his portion of the ticket and without waiting for the reading means to complete its task, thereby saving time and speeding up entrance of fans. However, if it is desired to have the writing means add data to the recording/data storage means on the ticket portion retained by the fan, it would be necessary to have that fan's portion placed in the reading and writing means and to be written upon. If the fan does the placing of the ticket or ticket portion into the reading means and the gate means could be automated to allow entry if the ticket is accepted by reading means, it is possible that arena entry could be "self serve" and the need for security personnel on every gate could be reduced or eliminated resulting in significant cost savings to the arena. This ticket reading method also clearly provides significant statistical data information gathering function, of the fuzzy logic analysis system indicated in FIG. 7., 711, capability at the central facility relating to arena management and operations. For season's ticket holders, their identification information as well as seat location could be automatically entered into the Camera System databases at ticket purchase thereby enriching the data information.

Figure 7:
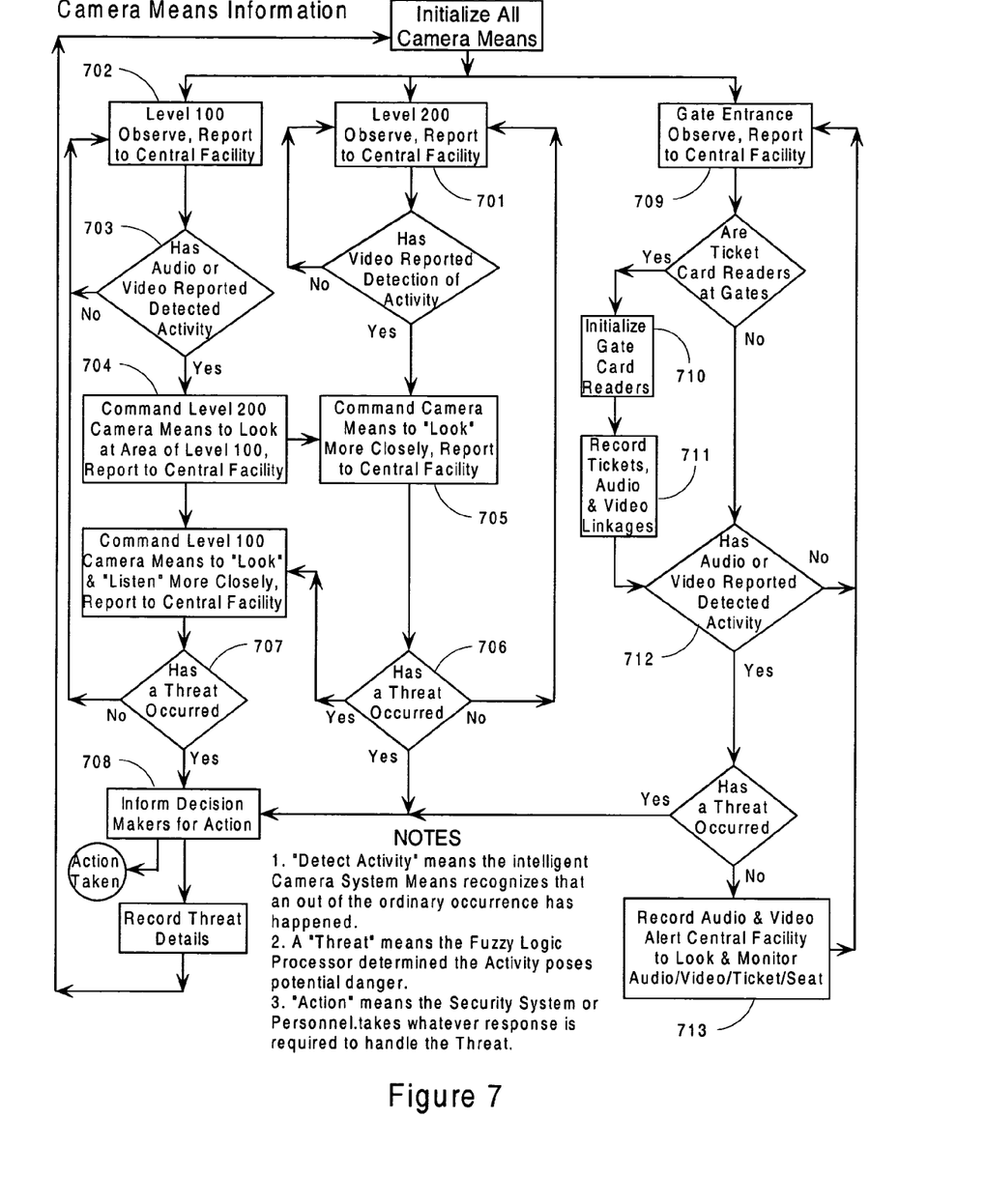
FIG. 7 is a schematic diagram of process flow incorporating the fuzzy logic processor of the Intelligent Camera Means system of FIG. 5, centering on analyses with fuzzy logic processor to learn from integrating the observations of different camera means and commanding functions to the local processor of the camera means to "look and listen" more closely for additional observations allowing improved determinations of threat.

If ticket tracking information is combined with the camera means, and ticket reading function located a the area entry gates such as Gate 9 indicated in FIG. 2., 205, and, the Camera System Means indicated in FIG. 1., 101 and in FIG. 3., 309, observing the fan upon entrance, then the fuzzy logic system indicated in the Camera Means Information system of FIG. 7., 712, together they could provide a major source of information, analyzed by the Ticket Card Reader Means Information system indicated in FIG. 8., 811, for recording and storing these data from the card reader using the fuzzy logic of the Ticket Card Reader Means Information system, 812, into the security fuzzy logic analysis, 813, database of the Camera System means as a function of the Ticket Card Reader Means Information system fuzzy logic, 814. If the ticket reading means, 303, illustrated in FIG. 3., also has a writing means, 307, as proposed above, data regarding the camera means observations could also be added to the information recorded by the Camera Means Information system illustrated in FIG. 7., 711, on the ticket recording/ data means, printing on the fan's ticket indicated in FIG. 3., 308, such as but not limited to identification for the images recorded by the camera means viewing the fan at the time of entering the arena via the gate being viewed, or writing, and recording these audio and video and ticket read data into a database for future reference, 713, including video data recording an actual image of the fan so recorded on the recording/data storage means, or the like.

With ticket tracking identification information such as the fan's seat location and the date and the performance at which the fan is attending recorded on the ticket recording/data storage means, a reading means, as illustrated in FIG. 3., 303, and if the reading and writing means is equipped with a visual display means, 310, and such reading and writing means is also installed, for example, at all alcohol vending areas, and the said fan's ticket is also so read at these vending areas, then the fuzzy logic system of the Ticket/Card Reading Means Information system indicated in FIG. 8., 801, like the beer counters illustrated in the arena shown in FIG. 2., 204, it could be arranged such that the ticket of the alcohol purchaser must first be read, and that information read from the ticket communicated to the Ticket/Card Reader Means Information system indicated in FIG. 8., 802, by the reading means and information so read and stored by the ;fuzzy logic of the Ticket/Card Reader Means Information system, 803, on one of the databases of the Camera System means before each and every purchase. The fuzzy logic of the Camera System means at the central facilities being part of the Camera Means Information system illustrated in FIG. 6., 612, would then add this current alcohol sale to the database information on this fan's alcohol purchases by the fuzzy logic of the Ticket/Card Reader Means Information system of FIG. 8., 804, such that the fuzzy logic system could request to the total of all previous such sales so recorded that day as accounted to this said ticket and only if that total so computed, 805, is less than a preset amount comparison made by the fuzzy logic of the Camera Means Information system indicated in FIG. 6., 613, will the Camera System means display on the visual display unit located at the said alcohol sales location illustrated in FIG. 8., 806, indicate approval for alcohol purchase if the total to that time is less than the preset limit and before the purchase is allowed to proceed by the bar tender serving the fan, 807, and if said limit is met or exceeded, the display would indicate via the fuzzy logic of the Camera Means Information system illustrated in FIG. 6., 614, no sale is to be allowed to that ticket holder and would be so displayed on the ticket reading and display system illustrated in FIG. 3., 311, such as "no sale" and/or a light or lights incorporated on the said display system, 312, such as a green illumination indicating "sale approved" and a red illumination indicating "no sale" or the like as analyzed and decided by the fuzzy logic of the Ticket/Card Reader Means Information system illustrated in FIG. 8., 808. This description is intended to be for the purchase of alcoholic beverages and display means could also include an audible means for indication to the seller, or also could include a loud speaker means incorporated into the ticket/card reading system indicated in FIG. 3., 313, to simulate the equivalent of the bar tender telling the fan patron (or patrons) he is "cut off" from all further drinks. This ticket tracking process, although described here for alcohol related purchases, is not limited to such and could apply to any and all activities of the fan while in the arena. The ticket reading means indicated in FIG. 3., could also include a writing means either electronically recording on the storage means of the ticket or a printing means to print a visible mark such as "Void", illustrated in FIG. 3., 314, indicating no further alcoholic sales to anyone displaying that ticket. Policing drinking at athletic events with ticket tracking processes could significantly reduce fan rowdiness, drunkenness and threats, and refusing to serve fans is one effective way to minimize this threat.

The camera means noted earlier in the SkyDome arena at the 200 level, illustrated in FIG. 2., 202 and the video camera system illustrated in FIG. 1., 101, communicating said video surveillance of the said fan to the Camera Means Information system fuzzy logic analyses illustrated in FIG. 7., 701, camera means, Camera Means Information system logic of FIG. 7. & Ticket/Card Reader Means Information system reading of the fan's ticket information for analyses indicated in FIG. 8., equipped with a zoom means sufficient to view any seat in the arena, could be combined with the 100 level camera means could communicate said video data observation to the central Facility Camera Means Information system logic and analyses processes indicated in FIG. 7., 702, such that if the 100 level camera means indicated to the Camera System means that a security risk or threat exists, then the fuzzy logic analyses of the Camera Means Information system 703, of the Camera System means could direct one or more of the 200 level camera means resulting from the threat analyses of these video data, to then using the fuzzy logic, 704, of the Camera Means Information system could direct the said level 200 camera means system to zoom in to view the area indicated to provide another view of the scene or vice versa. This functionality could be combined with the ticket tracking function and the 200 level camera means fuzzy logic of the Camera Means Information system direct the said cameras so that they could zoom as determined by said fuzzy logic, 705, in to view on the very seat for which that ticket was purchased. Additionally, these 200 level camera means can provide discreet non-intrusive observation of the entire arena to consider if any threat has been detected at any location the cameras view in the entire arena implementing the fuzzy logic indicated in FIG. 7., 706. However, clearly every arena will have its own particular construction and layout and the use of "200 level" or "100 level" camera means is only illustrative of placement of camera means for more distant and for more close up viewing and the numbers of camera means and sensors and their locations would be selected and arranged appropriate to the arena in which they are used.

The Camera System means of this invention is intended as a tool to assist security personnel and systems to automatically detect potential threats as determined by the fuzzy logic of the Camera Means Information system illustrated in FIG. 7., 707, and to report these to the security systems and personnel, 708, as appropriate. The actions of persons resulting from drunkenness include but are not limited to difficulty in walking due to drunken condition as well as aggressive behavior such as loud talking and yelling and often accompanied with swearing, and are just some of the reactions that the Camera System means can be programmed to detect and that it can learn to observe.

Figure 4:
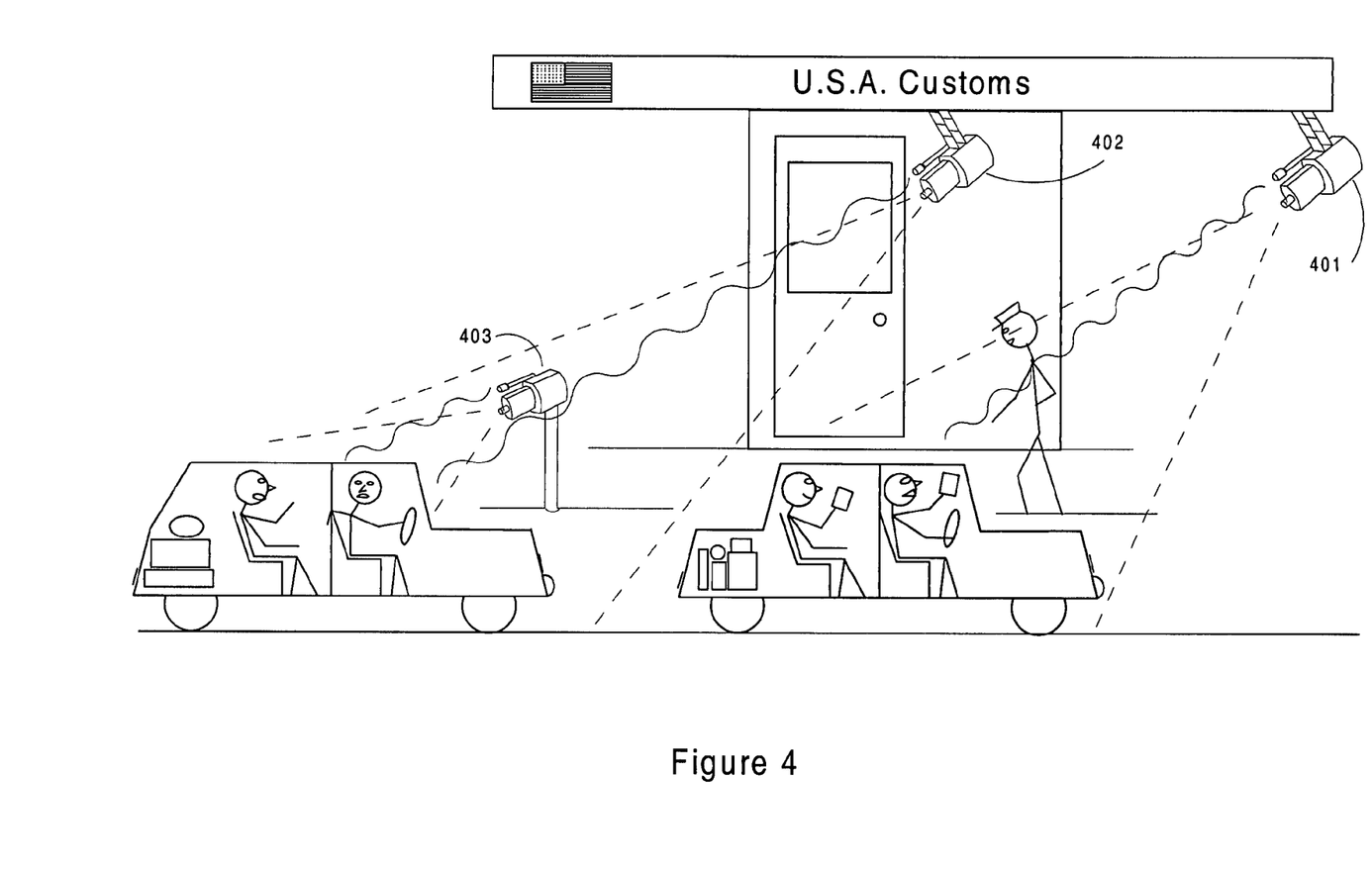
FIG. 4 is a schematic diagram of a border crossing, and in particular a representation of a USA crossing, illustrating relative locations of the camera means relative to a vehicle being inspected and the next vehicle awaiting inspection according to an embodiment of the present invention.

The sports arena is just one of a plurality of applications to which the Camera System means revealed in this invention that anyone skilled in the art of security systems and their implementation can immediately recognize and understand by this invention. Another example of a preferred embodiment is use in border security and security of regions, areas, compounds and the like. FIG. 4 illustrates an application to a USA border crossing in which invalid entry, smuggling, terrorist activity or movement are just some of the threats to which the Camera System means of this invention could provide a tool to assist security personnel, border guards and security systems.

Camera means including audio and video observations and recordings are illustrated in FIG. 4, as gantry mounted units, 401,402, and as a post mounted unit, 403, which are arranged to observe the actions, speech, emotions, and the like of the occupants of cars approaching and at the guard kiosk while the Camera System means automatically analyzes the data recorded. As described earlier the Camera System means searches its databases and central facilities including stress analysis, lie detection, emotional stress, deep text extraction and the like to determine if a threat or potential threat or criminal action or terrorist or other undesirable is present. If such a threat or potential is detected the Camera System means immediately informs the security border guard and the security systems and personnel for appropriate actions to be taken. 45. In this illustration, camera means unit, 401, is observing the vehicle at the guard kiosk, and is viewing the occupants recording video images and sounds and speech of the occupants and the guard. Camera means, 402, is recording the similar information observing the occupants of the next vehicle waiting to approach the security border guard; however, this camera means will attempt to observe the actions of the occupants and their "private" discussions and actions prior to addressing the guard. Often discussion between occupants may be very revealing of the intentions to carry out threatening or illegal actions. Viewing the next vehicle waiting by a camera means at some distance from the vehicle can also permit identification of the vehicle type and license plate, and camera means, 402, could also be located to view the rear of the waiting vehicle and the rear license plate. Camera means, 403, could be located very close to the waiting vehicle to more closely view the occupants and if possible hear their conversation, and if not audibly hearing their speech, then possibly using the Lip Reading observations and analyses revealed in this invention to provide the Camera System means with the data needed for recognition of text, permitting deep extraction of words, phrases and meanings related to threats or potential threats.

In this illustration, camera means unit, 401, is observing the vehicle at the guard kiosk, and is viewing the occupants recording video images and sounds and speech of the occupants and the guard. Camera means, 402, is recording the similar information observing the occupants of the next vehicle waiting to approach the security border guard; however, this camera means will attempt to observe the actions of the occupants and their "private" discussions and actions prior to addressing the guard. Often discussion between occupants may be very revealing of the intentions to carry out threatening or illegal actions. Viewing the next vehicle waiting by a camera means at some distance from the vehicle can also permit identification of the vehicle type and license plate, and camera means, 402, could also be located to view the rear of the waiting vehicle and the rear license plate. Camera means, 403, could be located very close to the waiting vehicle to more closely view the occupants and if possible hear their conversation, and if not audibly hearing their speech, then possibly using the Lip Reading observations and analyses revealed in this invention to provide the Camera System means with the data needed for recognition of text, permitting deep extraction of words, phrases and meanings related to threats or potential threats.

Another example application of the Camera System means revealed in this invention that would be obvious to anyone skilled in the art, is the observations of persons using a banking machine, "green machine", automatic teller machine (ATM) and the like. Often these machines include a surveillance video camera; however, as noted earlier this only records video for later, laborious searching often frame by frame done by security personnel. The Camera System means revealed can observe the actions, sounds and speech and conduct the analyses as outlined earlier to determine if the person or persons using the ATM is under stress or in discussion that would indicate criminal activity including but not limited to a thief threatening the card holder and forcing him to withdraw money. In a preferred embodiment, the Camera System means would already have on record the image of the card holder and could detect if the person using the card was entitled to use it and if not, the Camera System means could instruct the ATM to retain the card and alert the security system and personnel for appropriate actions.

In a preferred embodiment of this invention, a plurality of interactions between audio and video information are revealed in this invention. It is possible that the audio recording of speech or lip reading functions of the Camera System means revealed in this invention could be used to trigger the implementation of the video camera to begin recording if continuous recording is not normally required. For example in the situation of a border crossing or the security clearance at an airport, if the word "bomb" is observed and/or recorded by the Camera System means, or for example in the situation of a store cashier or bank being monitored by the Camera System means and the words "this is a holdup" and "give me your money" are observed; these could immediately trigger the Camera System means to activate video observations and recording and alerting of security personnel and systems. It is also possible that in the example of the arena, the distant viewing video camera means at the "200 level" could observe a situation which could be interpreted by the Camera System means to activate both the audio and video camera means at the "100 level" nearest the situation.

A preferred embodiment of this invention includes a plurality of interactions between databases sharing of security information we reveal in this invention. With appropriate data linkages, it is possible for example, that the observation and detection of a potential terrorist or suspicious person crossing the border into a country as recorded and stored into a database by our Camera System means at the border such that the database, later can be searched and shared by the security authorities at a major event such as a Super Bowl type of football game where an unusual delivery of a suspicious package is occurring at the football arena as detected and recorded by our similar Camera System means at the arena. Herein, the system conducts a facial analysis of the delivery driver which, if matched to that of the border crossing person stored in the border system databases, causes the system to inform the security authorities immediately to take necessary actions. Also with appropriate data linkages, it is possible that the observation, detection and database storage of the images and information by our Camera System means about a rowdy or threatening fan at one arena venue, later can be searched by the Camera System means at a different arena venue for purposes such as live screening of fans entering that second venue or identifying a fan being observed and detected to be acting suspiciously and with a matching of facial and other information in the databases, the system informs the authorities to take necessary actions.

Such interactions between databases can be real-time or historic or mixtures of both and can involve the Camera System means learning as observations and analyses are made and recorded. In the example of the arenas, a first observation could be of a fan appearing to be staggering in his walking which the system may detect as suspicious but not in itself a threat. A second observation, possibly later of that same fan falling in an aisle on the way to his seat adds to the suspicion that there may be a problem with the fan, at which point the system may decide to watch the fan continuously from there on. At a third observation of that fan later standing up and screaming obscenities at players on the arena field, the system would inform security personnel to investigate the fan and take necessary actions. However, if the Camera System means through access to related databases has access to medical and health information, the fuzzy logic processor may be able to assess if the fan being observed is in fact having a health problem such as but not limited to heart attack, diabetic coma, epileptic seizure and the like needing immediate medical assistance.

Learning by the Camera System means in the example of the border crossing, first observation could be the camera means closest to the next vehicle waiting to approach the border guard kiosk and could detect the driver talking suspiciously to a passenger, but the system analysis of speech text extraction of the person, in itself, may not be recognized as a threat. A second observation by the camera means at the kiosk when the vehicle moves to the kiosk and the driver is answering the questions from the guard could result in the system stress analysis detecting heightened stress in the voice or actions of the driver at which point the system has learned that these two observations in sum are sufficient to be deemed a threat and informs the security personnel and border guard to take necessary action.

The implementation of the Camera System means in the roadside inspection of drivers for intoxication, often called the RIDE (reduce impaired driving everywhere) is a similar embodiment to the boarder example and can include the capability to observe the occupants in "the next vehicle waiting inspection" by authorities policing drinking and driving in which the Camera System means can observe the actions and conversation of those occupants as they await inspection. The Camera System means can conduct its analyses and inform the authorities if it detects impairment due to drugs or alcohol abuse and the threat that may indicate for the public.

An extension of the detection of impaired driving is a preferred embodiment of the Camera System means in which the camera means system is located in a vehicle and could include the fuzzy logic analyses and a GPS location device and interface to the vehicle such that when a driver attempts to start the vehicle, the camera means system can observe the driver and conduct analyses to determine if the driver is impaired and if so determined the system will not allow the car to be started and will immediately report by wireless communications, the situation and vehicle's GPS location to the central controller for notification to the proper authorities. If the vehicle is successfully started by someone not detected to be impaired, and is then being driven, the system can repeatedly observe the driver and conduct analyses to determine if the driver is impaired and if so determined, the system will immediately report by wireless communications, the situation and vehicle's GPS location to the central controller for notification to the proper authorities and at the earliest safe conditions such as the vehicle is stopped or the ignition is turned off, the system will disable the vehicle and again report the situation and vehicle's GPS location to the central controller for notification to the proper authorities.

Further as a deterrent to an impaired driver getting a sober person to start the car hoping that the impaired driver could fool the system and drive the car once started; the camera means system analyses can be designed to conduct facial recognition of the person attempting to start the vehicle and the system could maintain the vehicle disabled and only enable the vehicle to allow persons who's facial analyses matches the facial images pre-stored in the memory storage means of the local controller means. If the system determines an attempt is being made to start the vehicle by an unrecognized person, the system can be arranged to report the situation and vehicle's GPS location to the central controller for notification to the proper authorities. This embodiment of the Camera System means clearly includes the capability for its uses as a vehicle theft detection and deterrent system.

The uniqueness of the Camera System means we reveal is a fusion of many technologies including but not limited to: 1) analyses systems such as stress analysis fused with deep extraction of information from multimedia; 2) component systems such as hardware/software fused with sensors; 3) information sources from real-time sensors and multimedia fused with stored data sources and analyses techniques; 4) linkages of person(s) fused with perceived threat(s) or perceived threat(s) fused with person(s); 5) security systems automation tools fused with security personnel operations. These technologies all can be located in the camera means or can be distributed between systems means at a central facility and system means at the camera means and system means at the ticket/card reading means or any combination of these or other component locations. Regardless of whether the embodiment is a self-contained unit or distributed systems, the Intelligent Camera System means is the all inclusive result of fusion of some or all of these technologies.

We have indicated just some but not all of the examples of preferred embodiments, applications and uses of the Camera System means revealed in this invention that would come to mind of a person or persons skilled in the art of security systems.

The embodiment of the invention in which an exclusive property is claimed are defined as follows:

1. A security camera means observational system comprising:
   a) a local controller, hardware, software, firmware and fuzzy logic including wireless or wired communications interface for communicating with a central controller facility;
   b) a camera audio and video recording device connected to said local controller for observing and recording and communicating to said central controller;
   c) a central controller with hardware, software, firmware and fuzzy logic for database storage and analyses of images and sounds from observed actions, appearances, activities, speech and movements of objects, animals, persons and surroundings within view and listening of the said camera device as communicated from said camera devices;
   d) a central controller with hardware, software, firmware and fuzzy logic for accessing both real-time data and historic data from related databases from sources of governments, of multimedia news agencies, of associated data for the purpose of conducting analyses for assessment and detection of threat or potential threat;
   e) an input device connected to said local controller for reading from or writing to magnetic or electronic storage data means and/or a manually entering data means for input to said local controller;
   f) an output device associated with said local controller for displaying visually or audibly or in printed means for presenting a selection of information and threat analysis results received from said central facility controller;

g) a camera movement device and interface to the local controller for three axis pointing, focusing/zooming and turn on/off control of the said camera device.

2. The security camera means as defined in claim 1, said input device including a "closed circuit" security camera and microphones, with magnetic tape recording and computer database data storage means, and a plurality of sensors, coupled to the local controller for providing information on a plurality of parameters related to the local area observed.

3. The security camera means as defined in claim 2, said sensors including a plurality of motion, heat, sound, vibration and air quality sensors for detection of people, animals, things or actions that are not of the regular normal occurrence or could pose a threat.

4. The security camera means as defined in claim 3, said actions are such as not to normally occur and thus are unusual and in the security sense, warrant examination more closely, and said threat is a thing, person, animal, action, sound, speech or perpetrated act that could be interpreted as a danger to a place, person, thing, entity, government or country.

5. The security camera means as defined in claim 2, said local controller including an input keyboard, key pad, touch screen manual device, a magnetic card or smart card reader/writer, a display, a voice I/O interface, and interface means.

6. The security camera means as defined in claim 2, said local controller including an output device being a computer video screen and speaker and indicator lights and printing means, magnetic or smart card recorder means, for providing or indicating information regarding validity or acceptance of a request for entrance or access or purchase based on analyses by said central controller.

7. The security camera means as defined in claim 1, said central controller monitoring and storing in databases the information communicated by the local controller, the data from the local camera and sensor means and analyzing this information and comparative information from related databases.

8. The security camera means as defined in claim 1, said central controller analyses includes a plurality of analyses logic including the use of fuzzy logic and comparisons accessing related databases of stored previous visual data such as faces of persons, and/or audio data such as speech, voice to text conversion, and/or text data such as key words or phrases from which the system using fuzzy logic matches those aspects of the current observations for the purpose of assessing the existence of a threat or potential threat.

9. The security camera means as defined in claim 1, said central controller analyses includes a plurality of analyses logic including the use of fuzzy logic and comparisons accessing "live" real-time related database sources of visual data such as faces of persons, and/or audio data such as speech, voice to text conversion, and/or text data such as key words or phrases from which the system using fuzzy logic matches those aspects of the current observations for the purpose of assessing the existence of a threat or potential threat.

10. A system as defined in claim 1, said central controller analyses includes a plurality of analyses methods including voice stress, emotion stress, actions and movement interpretation, image matching, speech/voice to text conversions, lip reading to text conversion, deep extraction of information from text, facial identity matching, voice identity matching and personal data matching and comparisons accessing live real-time related database sources of visual data such as faces of persons, and/or audio data such as speech, and/or text data such as key words or phrases from which the system using fuzzy logic matches those aspects of the current observations for the purpose of identifying people, animals, things, actions, speech, and stress that indicate the existence of a threat or potential of a threat.

11. The security camera means as defined in claim 1, said central controller can communicate to the local controller of said camera means commands for said pointing focusing/zooming, viewing direction, viewing zoom magnification and turning on/off camera controls.

12. The security camera means as defined in claim 1, said local controller incorporates part or all of said central controller functions and capabilities such that the said camera means could be a stand alone complete Camera System means utilizing microelectronic designs, circuitry miniaturization and solid state memory systems.

13. The security camera means as defined in claim 1, said local controller utilizing fuzzy logic and microelectronic designs, circuitry miniaturization and solid state memory systems, incorporates part or much of the said central controller functions and capabilities such that the said camera means becomes more independent from the central controller and capable of conducting much of the analyses and response function directly.

14. The security camera means as defined in claim 1, said input device including a camera and/or a "closed circuit" security camera which said camera can observe and record said observation in a spectral range including but not limited to the visible, the near infrared, the infrared, the far thermal or heat range infrared, and the ultraviolet regions of the electromagnetic spectrum, and microphones, with magnetic tape recording and computer database data storage means, and a plurality of sensors, coupled to the local controller for providing information on a plurality of parameters related to the local area observed.

15. A security camera means observational system comprising:

a. a local controller, hardware, software, firmware and fuzzy logic including wireless or wired communications interface for communicating with a central controller facility;

b. a camera audio and video recording device connected to said local controller for observing and recording and communicating to said central controller;

c. a central controller with hardware, software, firmware and fuzzy logic for database storage and analyses of images and sounds from observed actions, appearances, activities, speech and movements of objects, animals, persons and surroundings within view and listening of the said camera device as communicated from said camera devices;

d. a central controller with hardware, software, firmware and fuzzy logic for accessing both real-time data and historic data from related databases from sources of governments, of multimedia news agencies, of associated data for the purpose of conducting analyses for assessment and detection of threat or potential threat;

e. an input device connected to said local controller for reading from or writing to magnetic or electronic storage data means and/or a manually entering data means for input to said local controller;

f. an output device associated with said local controller for displaying visually or audibly or in printed means for presenting a selection of information and threat analysis results received from said central facility controller;

g. a camera movement device and interface to the local controller for three axis pointing, focusing/zooming and turn on/off control of the said camera device.

16. The security camera means as defined in claim 15, said central controller analyses includes a plurality of analyses logic including the use of fuzzy logic and comparisons accessing related databases of stored previous visual data such as faces of persons, and/or audio data such as speech, voice to text conversion, and/or text data such as key words or phrases from which the system using fuzzy logic matches those aspects of the current observations for the purpose of assessing the level of sobriety due to drug or alcohol use and the existence of a resulting threat or potential threat.

17. The security camera means as defined in claim 15, said central controller analyses includes a plurality of analyses methods including voice stress, emotion stress, actions and movement interpretation, image matching, speech/voice to text conversions, lip reading to text conversion, deep extraction of information from text, facial identity matching, voice identity matching and personal data matching and comparisons accessing stored related database sources of stored previously of visual data such as faces of persons, and/or audio data such as speech, and/or text data such as key words or phrases from which the system using fuzzy logic matches those aspects of the current observations for the purpose of identifying people, animals, things, actions, speech, and stress that indicate the level of sobriety due to drug or alcohol use and the existence of a resulting threat or potential of a threat.

18. The security camera means as defined in claim 15, for the detection and analyzes of alcohol or drug intoxication or impairment of a person or persons for the detection of person or persons as a potential threat to the public and/or to property and/or to themselves.

19. The security camera means as defined in claim 18, said analyzes determining a level of intoxication or impairment so as to assign a numerical value to said level, as an indication within a standard set of said levels as to the said intoxication or impairment of the person or persons similar to the application of breathalyzer standards used to describe the level of alcohol intoxication as determined by chemical measure of the breath of a person.

20. The security camera means as defined in claim 15 for the detection of health related problems such as heart attack, diabetic or epileptic seizure, drug use or abuse, drunkenness and the like.

* * * * *